United States Patent [19]

Jeong et al.

[11] Patent Number: 5,696,648
[45] Date of Patent: Dec. 9, 1997

[54] SEALING DEVICE FOR A HARD DISK DRIVE

[75] Inventors: Gi-Tag Jeong; Jong-Gyu Chae, both of Suwon, Rep. of Korea

[73] Assignee: Samsung Electronics Co., Ltd., Suwon, Rep. of Korea

[21] Appl. No.: 676,962

[22] Filed: Jul. 8, 1996

[51] Int. Cl.$^6$ .................................................. G11B 33/14
[52] U.S. Cl. ................................................ 360/97.02
[58] Field of Search ............................ 360/97.01, 97.02

[56] References Cited

U.S. PATENT DOCUMENTS 5,021,905  6/1991  Sleger ............................ 360/97.02
5,559,650  9/1996  Repphun ......................... 360/97.02

*Primary Examiner*—A. J. Heinz
*Attorney, Agent, or Firm*—Jones & Volentine, LLP

[57] ABSTRACT

A sealing device for a hard disk drive for easily assembling a base and a cover to be sealed to each other. The sealing device of the hard disk drive including a base and a cover assembled with the base includes a side wall extending upwardly from the edge of the base. A step is recessed by a constant width and length from an upper portion of the side wall. A side surface extends downwards from the edge of the cover in order to be positioned in the step of the side wall of the base. A gasket is installed between the inside of the side surface of the cover and upper portion of the side wall of the base upon assembling the base and the cover.

11 Claims, 4 Drawing Sheets

SEALING DEVICE FOR A HARD DISK DRIVE

CROSS REFERENCE TO RELATED APPLICATIONS

The subject matter of the present application is related to that in co-pending applications Ser. Nos. 08/653,968, entitled "Method for Detecting Data Stroke for Disk Drive", filed May 28, 1996; 08/656,878, entitled "System and Method for Controlling Spindle Motor for Hard Disk Drive Unit", filed May 30, 1996; 08/658,099, entitled "Method for Generating Index Pulse with Index Pattern", filed Jun. 4, 1996; 08/657,665, entitled "Servo Information Recording Method for a Magnetic Recording Medium", filed May 31, 1996; 08/659,737, entitled "Data Sector Pulse Generating Method", filed Jun. 6, 1996; 08/661,492, entitled "Servo Sector Forming Method for Fast Detection and Track Address Correcting Method", filed Jun. 11, 1996; and 08/661,491, entitled "Method for Determining a Position of Track-Zero and Mapping Tracks According Thereto, filed Jun. 11, 1996, incorporated herein by reference.

FIELD OF THE INVENTION

The present invention relates to a sealing device for a hard disk drive and, more particularly, to a sealing device of a hard disk drive for assembling both a cover and a base of the hard disk drive to be sealed to each other.

BACKGROUND OF THE INVENTION

In general, a hard disk drive (hereinafter, referred to as HDD) which is widely used as an auxiliary memory device in a computer system, in brief, writes (stores) and reads information by using a magnetic head and a recording media (i.e., media or disk). In order to make the HDD a high reliability product, most HDDs are assembled under "clean room" conditions such that no dirt, dust, or other contaminants enter the HDD. Once assembled, the HDD remains sealed under normal service conditions.

For the purpose of reading or writing information, the HDD utilizes the recording media which is rotated at a high speed by a spindle motor. The magnetic head "floats" or flies above the surface of the recording media at an extremely low flying height. If any extraneous dust or moisture should enter the HDD, a head crash may result, causing the head to contact the surface of the recording media and causing a scratch or other defect to be formed on the recording media. Such head crashes can cause a loss of data and/or permanent damage to the recording media, thus reducing the reliability and lifespan of the HDD.

Thus, when assembling a HDD, it is desirable, after an initial cleaning, to prevent contamination of the HDD during subsequent assembly processes. Or, if necessary, a recleaning of partially manufactured units should occur if they are to be used later. Upon final assembly, a base and cover for the HDD are assembled and sealed to each other in order to prevent the influx of external contaminants such as dust or moisture.

FIGS. 1 through 4 illustrate a sealing device for a conventional hard disk drive. FIGS. 1 and 2 illustrate a particular embodiment of the prior art sealing device.

Referring now to FIGS. 1 and 2, the HDD is comprised of a base 20 including a circuit substrate (not shown), a series of units (not shown), and a side wall 21 extending upwardly from the edge of base 20. A cover 22 which includes a side wall 23 extends downwards from the edge of cover 22 in order to contact side wall 21 of base 20 and prevent the interior of the HDD from being contaminated from the external environment. A gasket 24 serves as an elastic material installed between contacting surfaces 21a and 23a of side walls 21 and 23, respectively, which contact each other upon assembling base 20 with cover 22. An adhesive material may be provided on the upper and lower surfaces of gasket 24 such that gasket 24 may be fixed between contacting surfaces 21a and 23a.

As discussed above, in order to assemble base 20 and cover 22 of the HDD to be sealed to each other, gasket 24 is fixedly adhered at the contacting surface 21a of base 20 and cover 22 is assembled thereat. At such time, gasket 24 is adhered to the contacting surfaces 21a and 23a of each of base 20 and cover 22 by adhesive material provided in the upper and lower surfaces thereof. In addition, base 20, cover 22 and gasket 24 are assembled to one another by tightening screw(s) (not shown). As a result, the HDD is sealed in a tightened format.

In the sealing device of a convention HDD constructed as described above, one side surface of gasket 24 is directly exposed to the external environment (such as dust or moisture). For this reason, the lifetime of gasket 24 may be reduced and damage to gasket 24 may occur. Consequently, such damage or failure may result in the interior of the HDD being contaminated due to the influx of minute dust particles or moisture generated by the rotation of the disk.

A further embodiment of the prior art will be described in connection with FIGS. 3 and 4. According to the embodiments of FIGS. 3 and 4, a HDD is comprised of a base 20 which includes a circuit substrate (not shown), a series of units (not shown) and a side wall 21 extending upwardly from the edge of base 20. A cover 22 includes a side wall 23 which extends downwards from the edge of the cover 22 in order to contact side wall 21 of base 20 and prevent the interior of the HDD from being contaminated due to the external environment. An adhesive tape 25 is provided for assembling base 20 and cover 22 to be sealed to each other.

To assemble base 20 and the cover 22 to be sealed to each other, after base 20 is assembled with cover 22, the HDD is completely sealed by tightening up the screw(s) (not shown) and applying the adhesive tape 25 to the tightened portion.

However, it is difficult to use the above method for sealing the base and the cover by adhesive tape, if the HDD is disassembled and reassembled during manufacturing. It may be difficult during manufacturing to remove the adhesive tape provided in the cover or in the base and may be difficult to re-tape such a drive upon reassembly. Moreover, a defect may be generated in the interior of the HDD if is contaminated due to influx of the external environment such as dust or moisture if the adhesive tape is damaged.

SUMMARY OF THE INVENTION

It is therefore an object of the present invention to provide a sealing device for a hard disk drive for easily assembling a base and a cover to be sealed to each other.

It is a further object of the present invention to provide a sealing device of a hard disk drive having a cover and a base assembled without externally exposing a sealing material.

It is a further object of the present invention to provide a sealing device for a hard disk drive for completely sealing a base and a cover of the hard disk drive to ensure the capacity and reliability thereof.

These and other objects of the present invention may be achieved in accordance with the principles of the present invention wherein a sealing device of a hard disk drive comprises a base including a circuit substrate, a series of units, a side wall extending upwardly from the edge of the base, and a step recessed by a constant width and length from an upper portion of the side wall. A cover includes a side wall extending downwards from the edge of the cover in order to be positioned in the step of the side wall of the base and then to be firstly sealed to the base upon assembling. A gasket is installed between the inside of the side surface of the cover and an upper portion of the side wall of the base in order to secondly seal the base and cover. Alternately, an adhesive tape may be provided at the assembled position.

BRIEF DESCRIPTIONS OF THE DRAWINGS

A more complete appreciation of the present invention and the many attendant advantages thereof will be readily apparent as the same becomes better understood by reference to the following detailed description when considered in conjunction with the accompanying drawings, in which like reference symbols indicate the same or similar elements, wherein.

DETAILED DESCRIPTION OF THE INVENTION

Figure 1:
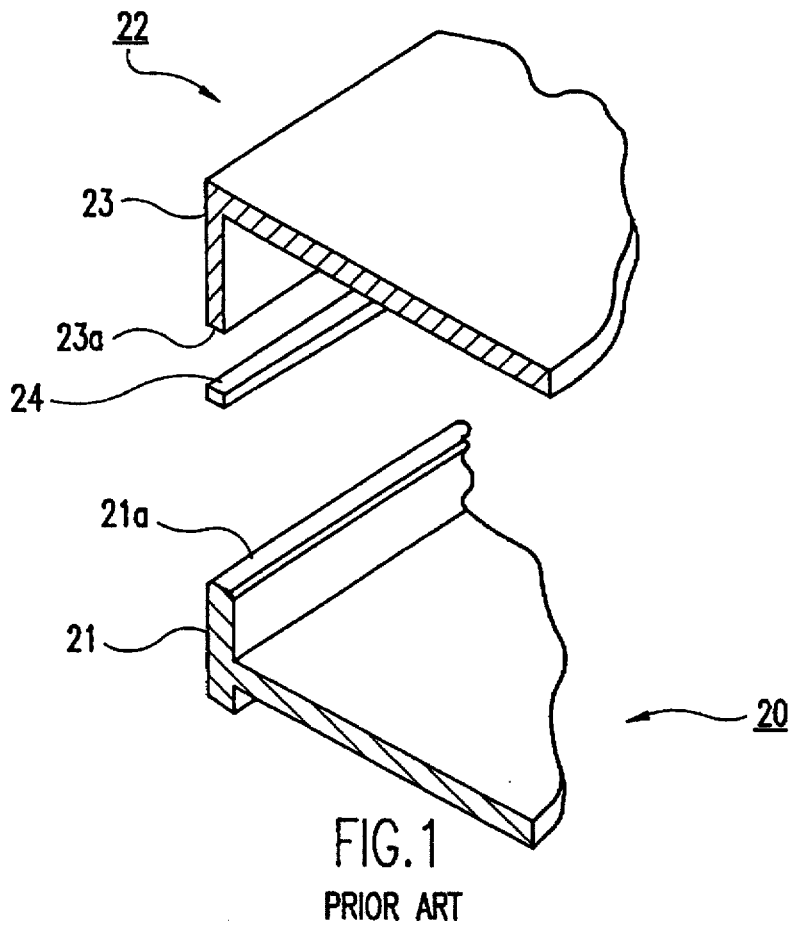
FIG. 1 illustrates the construction of a sealing device of a conventional hard disk drive.
Figure 2:
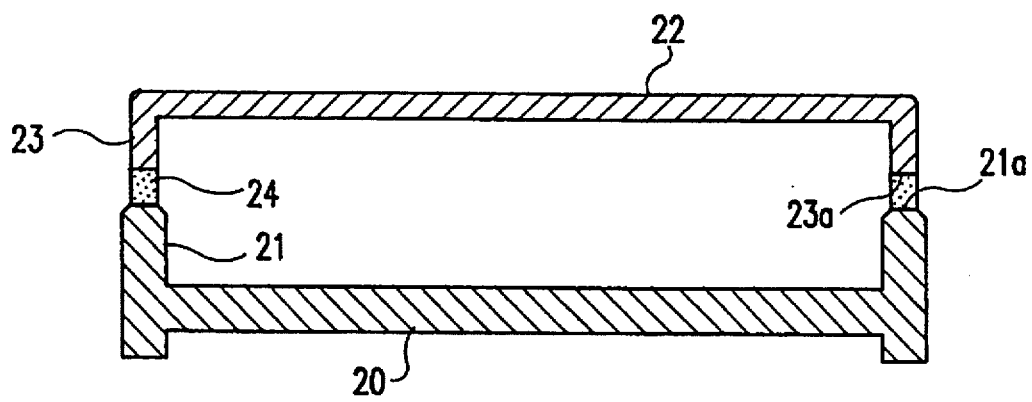
FIG. 2 is a sectional view illustrating a state where a base and a cover of FIG. 1 are assembled to each other.
Figure 3:
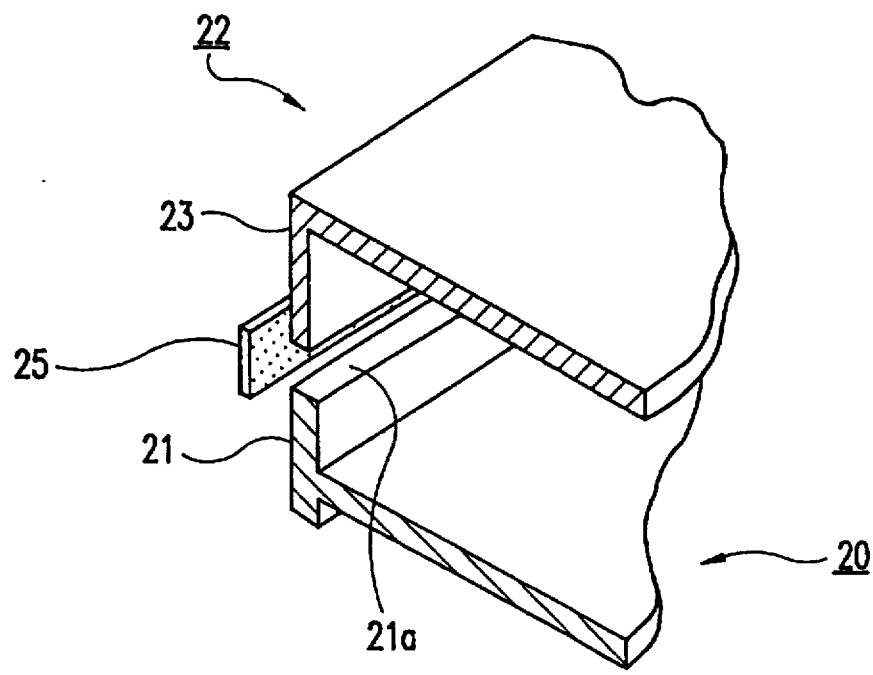
FIG. 3 illustrates another embodiment of a conventional sealing device.
Figure 4:
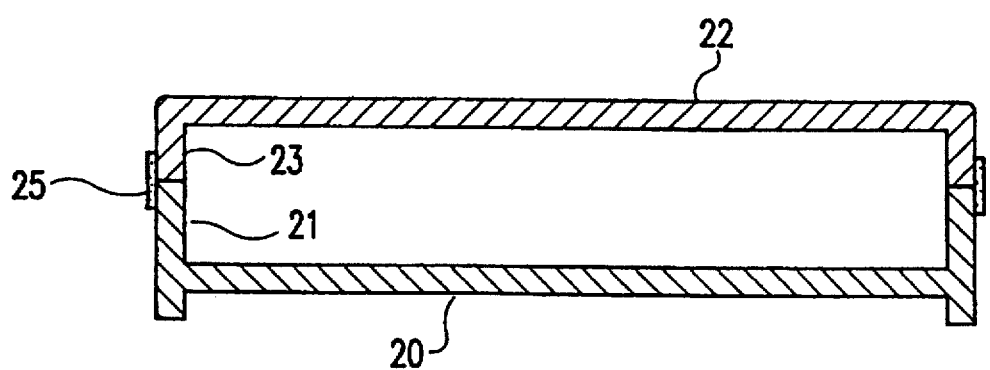
FIG. 4 is a sectional view illustrating a state where a base and a cover of FIG. 3 are assembled to each other.
Figure 5:
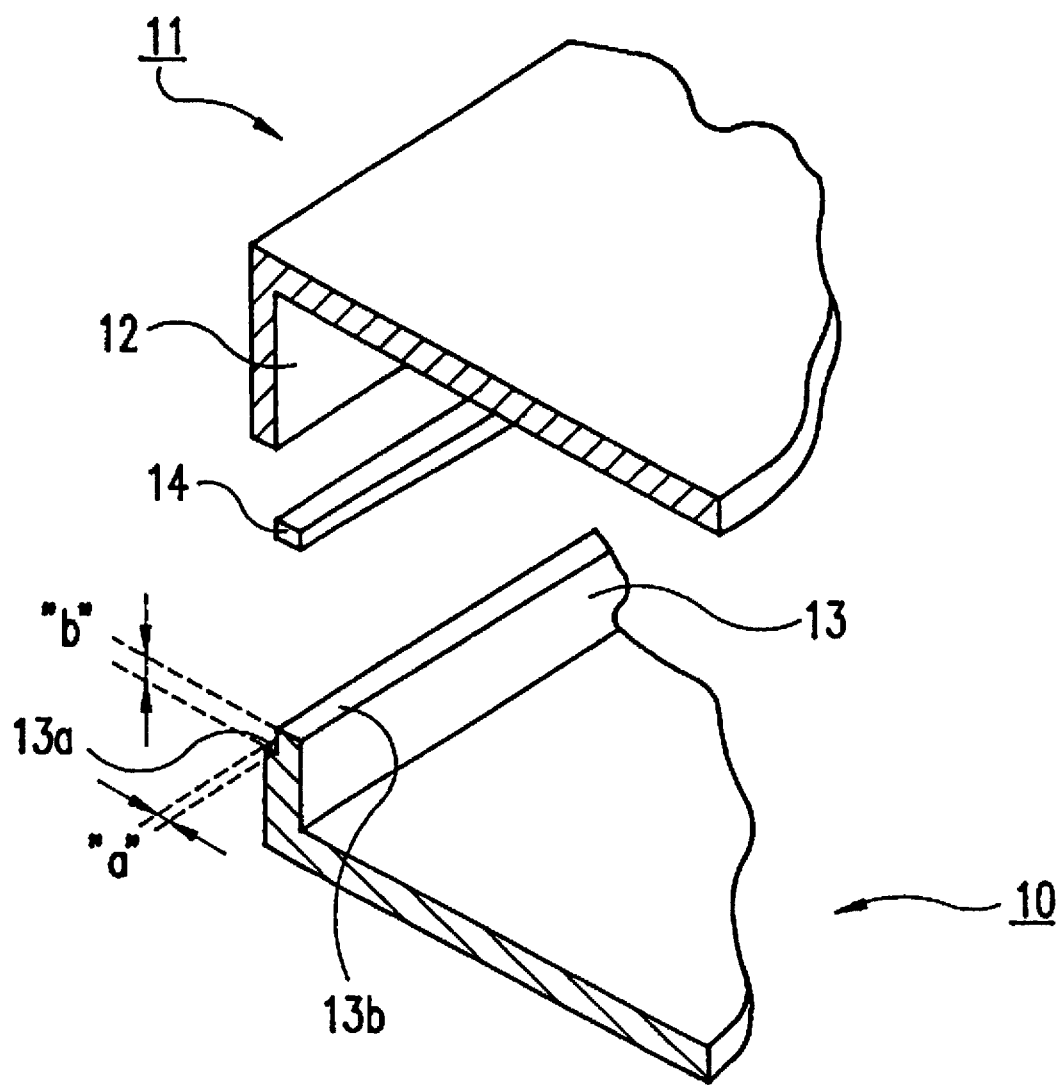
FIG. 5 illustrates the construction of a sealing device of a hard disk drive according to the present invention.
Figure 6:
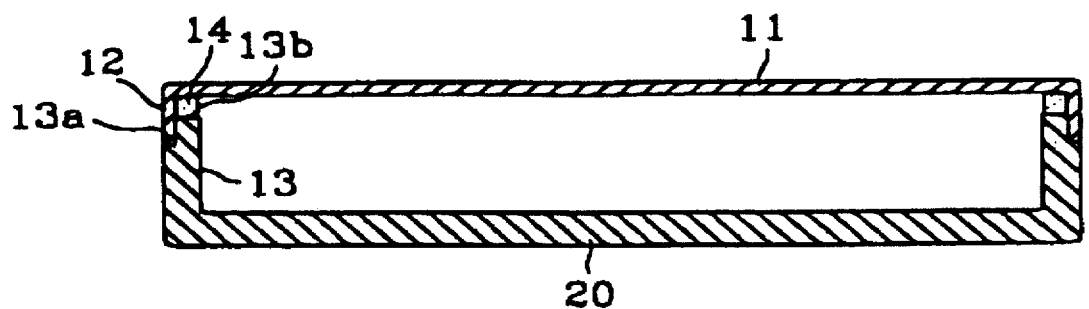
FIG. 6 is a sectional view illustrating a state where a base and a cover of FIG. 5 are assembled to be sealed to each other.
Figure 7:
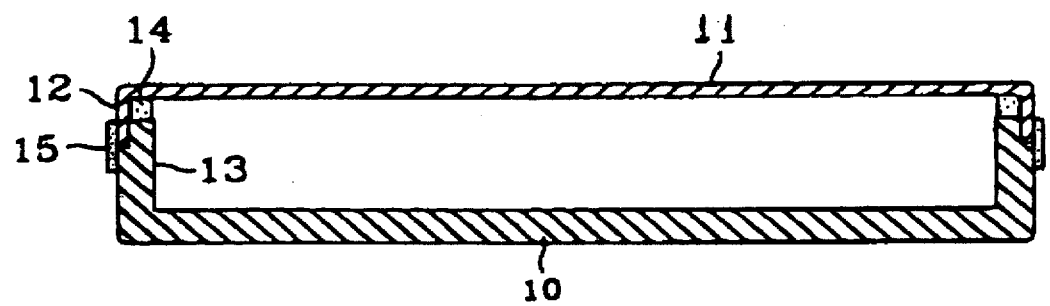
FIG. 7 illustrates another embodiment of the sealing device of a hard disk drive according to the present invention.

FIGS. 5 through 7 are views illustrating the construction of a sealing device of a hard disk drive according to the present invention. A first embodiment of the present invention will be described hereinafter with reference to FIGS. 5 and 6.

In the HDD illustrated in FIGS. 5 and 6, a base 10 includes a circuit substrate (not shown), a series of units (not shown) and is provided with a cover 11 for preventing the influx of dust or moisture from the external environment. Here, cover 11 forms a side surface 12 extending downwards from the edge thereof in order to be sealed to base 10. Base 10 forms a side wall 13 extending upwardly from the edge thereof and a step 13a recessed by a constant width "a" and length "b" from an upper portion of the side wall 13. In this instance, the width "a" of the step 13a is equal to or more than the thickness of the side surface 12 of cover 11 and the length "b" thereof is equal to or less than a length of side surface 12. Also, the sealing device is comprised of a gasket 14 comprising an elastic material installed between an upper surface 13b of side wall 13 on base 10 and the interior of side surface 12 of cover 11 in order to assemble base 10 and cover 11 to be sealed to each other. Then, there is an adhesive material to be fixedly applied at the inside of the side surface 12 of cover 11 and the upper surface 13b of side wall 13 of base 10 between respective side and lower surfaces of gasket 14.

As described above, after completing assembly of all kinds of units in the HDD, the HDD is completely sealed by providing gasket 14 at the upper surface 13b of the side wall 13 of base 10 and being assembled with cover 11. At this moment, side surface 12 of cover 11 is positioned at step 13a of side wall 13 and the side surface of gasket 14 is contacted with the inside of side surface 12 of cover 11. Finally, gasket 14 as the elastic material is contacted with base 10 and cover 11 by tightening up a screw or screws.

With respect to sealing device of the HDD according to the present invention, since the side surface 12 of cover 11 is banded and extends downwards from the edge of cover 11, a stiffness of cover 11 can be increased, thereby preventing variation (such as bending) by an external force. Additionally, side surface 12 of cover 11 may be completely sealed with gasket 14, preventing the influx from the external environment, such that the lifetime of gasket 14 may be prolonged.

FIG. 7 illustrates another embodiment of a sealing device of the hard disk drive according to the present invention. In the embodiment of FIG. 7, a gasket 14 seals cover 11 and base 10. An adhesive tape 15 seals the gap between base 10 and cover 11 after assembling base 10 to cover 11.

As noted above, following the assembly of base 10 and cover 11, the HDD is completely sealed by tightening up a screw or screws and providing adhesive tape 15 at the gap between base 10 and cover 11.

Thus, as a result of using gasket 14, side surface 12 and adhesive tape 15 provided at the gap between base 10 and cover 11, the HDD is thirdly sealed, thereby preventing damage on the product due to influx of dust or moisture from the external environment.

As apparent from the foregoing, the sealing device of the hard disk drive according to the present invention has the advantage that, since the sealing operation may be performed firstly by a side surface of the cover for preventing exposure of the gasket to the external environment, secondly by using the gasket as a sealing material, and thirdly by an adhesive tape, the lifetime of the gasket may be prolonged. Accordingly it has a positive effect on ensuring the capacity and reliability of the product.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A sealing device for a hard disk drive including a base and a cover assembled with said base, said sealing device comprising:

a side wall extending upwardly from edges of said base;

a step in said base, said step recessed by a constant width and length from an upper portion of said side wall;

a side surface extending downward from edges of said cover in order to be positioned in said step of said side wall of said base; and a gasket installed between the inside of said side surface of said cover and the upper portion of said side wall of said base upon assembling said base and said cover, wherein each of said side wall, said step, said side surface, and said gasket are substantially quadrilateral.

2. The sealing device of claim 1, wherein the width of said step in said base is equal to a thickness of said side surface of said cover.

3. The sealing device of claim 2, wherein the length of said step is equal to or less than that of said side surface of said cover.

4. A sealing device for a hard disk drive including a base and a cover assembled with said base, said sealing device comprising:

a side wall extending upwardly from edges of said base;

a step in said base, said step recessed by a constant width and length from an upper portion of said side wall; and a side surface extending downward from edges of said cover in order to be positioned in said step of said side wall of said base, providing a first sealing interface between said cover and said base;

a gasket installed between the inside of said side surface of said cover and the upper portion of said side wall of said base upon assembling said base and said cover, providing a second sealing interface between said cover and said base; and an adhesive tape for sealing a gap between said base and said cover, providing a third sealing interface between said cover and said base.

5. The sealing device of claim 4, wherein the width of said step in said base is equal to a thickness of said side surface of said cover.

6. The sealing device of claim 5, wherein the length of said step is equal to or less than that of said side surface of said cover.

7. A disk drive comprising:

a base;

a cover assembled with said base; and a sealing device for sealing said cover to said base, said sealing device comprising:

a side wall extending upwardly from edges of said base;

a step in said base, said step recessed by a constant width and length from an upper portion of said side wall;

a side surface extending downward from edges of said cover in order to be positioned in said step of said side wall of said base, providing a first sealing interface between said cover and said base, and wherein each of said side wall, said step, and said side surface are substantially quadrilateral; and a gasket installed between the inside of said side surface of said cover and the upper portion of said side wall of said base upon assembling said base and said cover, providing a second sealing interface between said cover and said base.

8. The sealing device of claim 7, wherein the width of said step in said base is equal to a thickness of said side surface of said cover.

9. The sealing device of claim 8, wherein the length of said step is equal to or less than that of said side surface of said cover.

10. The sealing device of claim 9, further comprising:

an adhesive tape for sealing a gap between said base and said cover, providing a third sealing interface between said cover and said base.

11. A sealing device for a hard disk drive including a base and a cover assembled with said base, said sealing device comprising:

a side wall extending upwardly from edges of said base;

a step in said base, said step recessed by a constant width and length from an upper portion of said side wall; and a side surface extending downward from edges of said cover in order to be positioned in said step of said side wall of said base, providing a first sealing interface between said cover and said base;

a gasket installed between the inside of said side surface of said cover and the upper portion of said side wall of said base upon assembling said base and said cover, providing a second sealing interface between said cover and said base; and an adhesive tape for sealing a gap between said base and said cover, providing a third sealing interface between said cover and said base, wherein each of said side wall, said step, said side surface, and said gasket are substantially quadrilateral, wherein the width of said step in said base is equal to a thickness of said side surface of said cover, and the length of said step in said base is equal to or less than a length of said side surface of said cover.

* * * * *